United States Patent [19]

Thompson

[11] Patent Number: 4,603,778
[45] Date of Patent: Aug. 5, 1986

[54] DETECTION OF DEFECTS IN CONVEYOR BELTS

[75] Inventor: Dennis W. Thompson, 19 Gandawarra Crescent, Newman, Western Australia, Australia

[73] Assignee: Dennis W. Thompson, Newman, Australia

[21] Appl. No.: 790,419

[22] Filed: Oct. 23, 1985

Related U.S. Application Data

[63] Continuation of Ser. No. 671,021, Nov. 13, 1984, which is a continuation of Ser. No. 435,411, Oct. 20, 1982.

[30] Foreign Application Priority Data

Oct. 26, 1981 [AU] Australia ............................... PF1295

[51] Int. Cl.⁴ ...................... B65G 43/02; B65G 43/06
[52] U.S. Cl. ..................................... 198/810; 198/856
[58] Field of Search .................. 198/502.1, 856, 810

[56] References Cited

U.S. PATENT DOCUMENTS

| | | | |
|---|---|---|---|
| 2,230,745 | 2/1941 | Eiselstein | 198/856 |
| 2,345,415 | 3/1944 | Nagy, Jr. | 198/856 |
| 2,633,229 | 3/1953 | Miller | 198/856 |
| 3,469,678 | 9/1969 | Schroder et al. | 198/856 |
| 3,680,686 | 8/1972 | Ciesielski | 198/810 |
| 3,963,115 | 6/1976 | Teske et al. | 198/810 |
| 4,002,231 | 1/1976 | Doty | 198/856 |
| 4,062,442 | 12/1977 | Schubert | 198/810 |
| 4,088,222 | 5/1978 | Hurt | 198/856 |
| 4,462,523 | 7/1984 | Kerr | 198/810 |

FOREIGN PATENT DOCUMENTS

| | | | |
|---|---|---|---|
| 1007332 | 3/1977 | Canada | 198/856 |
| 2221296 | 11/1973 | Fed. Rep. of Germany | 198/856 |
| 146701 | 2/1981 | German Democratic Rep. | 198/856 |
| 148330 | 5/1981 | German Democratic Rep. | 198/856 |
| 1424510 | 2/1976 | United Kingdom | 198/856 |
| 154816 | 11/1963 | U.S.S.R. | 198/856 |

*Primary Examiner*—Joseph E. Valenza
*Assistant Examiner*—Daniel R. Alexander
*Attorney, Agent, or Firm*—Murray and Whisenhunt

[57] ABSTRACT

Apparatus for detecting a defect in a conveyor belt includes anchors holding a line substantially taut in a position extending across and in close proximity to a moving surface of the conveyor belt, and a trigger device responsive to loss of tension or increased tension in the line, caused by disturbance of the line by a protrusion in the belt surface arising from the defect, to initiate a reaction to the disturbance.

11 Claims, 5 Drawing Figures

DETECTION OF DEFECTS IN CONVEYOR BELTS

This is a continuation application of Ser. No. 671,021, filed Nov. 13, 1984; which in turn is a continuation of Ser. No. 435,411, filed Oct. 20, 1982.

This invention relates to the detection of defects in conveyor belts and provides both a method of detecting such defects and apparatus embodying the method.

In a known arrangement for detecting conveyor defects, multiple profiled bars are suspended transversely under the conveyor between, the impact roller sets. The bars are typically linked by a pair of rods extending parallel to the conveyor line. Each of these rods is operatively associated with a rat-tail microswitch by way of a washer or ring. Should a protrusion in the conveyor hit the bars, the latter are projected in the direction of conveyor travel, whereby one or both of the connecting rods actuate a microswitch to stop the conveyor.

This arrangement entails physical congestion in the impact area which makes both cleaning and roller maintenance difficult and time consuming. The device is insensitive to light impact from small material spillage or loose patches, yet many production delays occur due to false trips in response to vibration in the bars produced by, e.g. impact shocks: operators are known to tie or wedge the device to maintain production continuity. Material spillage occasionally wedges the device, rendering it inoperable, while regular maintenance is required to keep the device operable. The installation is quite expensive, given that several are required per conveyor, and adjustment or modification of the bar profile is difficult. There is a risk of additional belt damage due to bars being caught by a belt flap or torn from their fixing to wedge between rollers, and a detection usually requires extensive resetting of the bars before operation can re-commence.

In another prior defect detection arrangement, a pan or tray is fixed, by a counterweight scale balance, below and cross the underside of the conveyor. The pivot makes contact with a microswitch. The pan acts as a material collection receptacle. In the event of a torn conveyor, the conveyed product falls through the aperture into the pan, the weight of the product overbalances the scale beam and thereby trips a switch to stop the conveyor.

This pan-type technique has been found to incur production delays due to product spillage tripping out the device. On the other hand, the reliability of product falling through an aperture in the belt is most unsatisfactory when the product is of a lump structure. The unit cannot detect defects such as protrusions in either the top or bottom sides of the conveyor belt. If the belt suffers puncture damage, spillage through the hole is usually insufficient to permit detection, whereby there is a risk of further damage when the consequent flap is caught elsewhere. Belt cuts may close up, reducing the spillage though protrusions are present. When a tear or rip is detected, damage is usually of a major nature due to the response time of the pan. Especially when lightweight materials are being handled, the length of a rip may be considerable before there is sufficient spillage though the rip to trip the mechanism. In general, the device does not detect defects, only the result, and considerable further damage often occurs before the mechanism is tripped. This delay can be intolerable when the material is of large lump size.

A third class of prior detector entails monitoring of a signal passed transversely through the conveyor. In one case, antennae to each side of the conveyor have the signal passing them interrupted by wires contained transversely within the belt. In an alternative arrangement, an ultrasonic pulse transmitted through the conveyor is distorted by rip damage. With both approaches, deviations of the monitored signal from a reference signal causes tripping of the conveyor drive.

The third class of detector is very expensive and relatively complex, involving in the first case special conveyor belts with built-in wires. Specialist maintenance personnel are required and a new reference calibration must be set after each repair. Reliability is by no means optimum.

It is accordingly an object of the invention to provide an improved arrangement for detecting defects in conveyors. In the context of this specification, the term "conveyor" is used in its broadest sense indicating any continuous moving support but the invention has special application to material-handling belt conveyors. The defects of concern include, inter alia, tears, rips broken wires, loose patches, depressions and punctures.

The invention stems from the realization that such defects generally result in a protrusion from the normal surface of the conveyor, whether such protrusions comprise a deflected part of the conveyor or spilled material from the conveyor.

The invention provides a method of detecting a defect in a moving conveyor comprising:

disposing a line so that it extends substantially taut across and in close proximity to a surface of the conveyor moving past the line; and monitoring disturbance of the line by a protrusion from said surface arising from said defect to initiate a reaction to such disturbance.

Said reaction may include the setting of a warning or alarm device and/or stopping movement of the conveyor.

The invention also provides, in a conveyor installation, apparatus for detecting a defect in the conveyor when it is moving, comprising:

means for holding a line substantially taut in a position extending across and in close proximity to a surface of the conveyor, which surface moves past the line during operation of the conveyor; and trigger means responsive to disturbance of the line by a protrusion from said surface arising from said defect to initiate a reaction to such disturbance.

The term "in close proximity" indicates that the string is profiled to the conveyor surface so that there is a nominal clearance, for example 6 to 10 mm, when the conveyor is loaded and making due allowance for the surface condition of and normal vibrations in the conveyor.

The string line may lie across and in close proximity to either the support surface or the undersurface of the conveyor, dependent upon convenience and location. The apparatus may further include support means such as tubes and/or clips, chains or like ties for locating and guiding the string line in the prescribed disposition.

Preferably, the line extends between a pair of anchors on said line holding means, the line being directly fixed to one of the anchors and coupled to the other by means including a tensioned spring, and wherein the trigger means is positioned to be responsive to movement of the line in the vicinity of the tension spring. The trigger means may comprise a ring in or attached to the line, and a switch device with a control element protruding through the ring for operative engagement by the ring as the ring moves on disturbance of the line. With this arrangement, the trigger means may be responsive, for example, to the pull of the spring in the event of a break in the line or by increased tension arising from a deviation of the line. Either of these disturbances might arise from an outstanding conveyor segment or from spilled material associated with a defect in the conveyor.

The invention will be further described, by way of example only, with reference to the accompanying drawings, in which.

Figure 1:
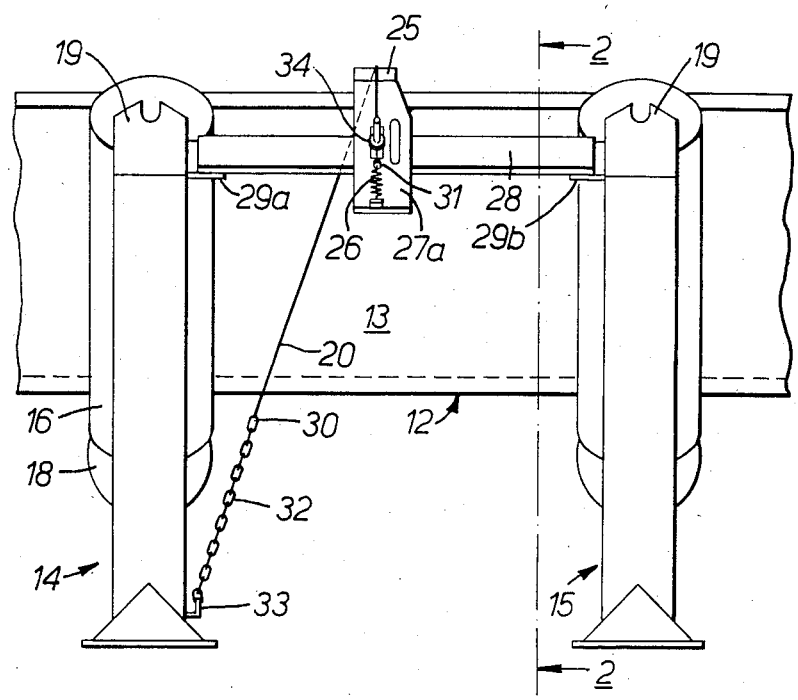
FIG. 1 is a side elevation of a material-handling troughed belt conveyor showing successive roller stands and interposed defect detection apparatus in accordance with the invention.
Figure 3:
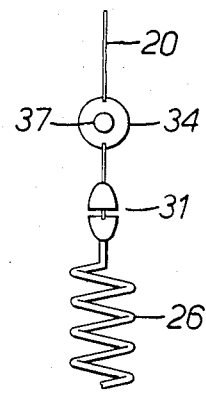
Figure 2:
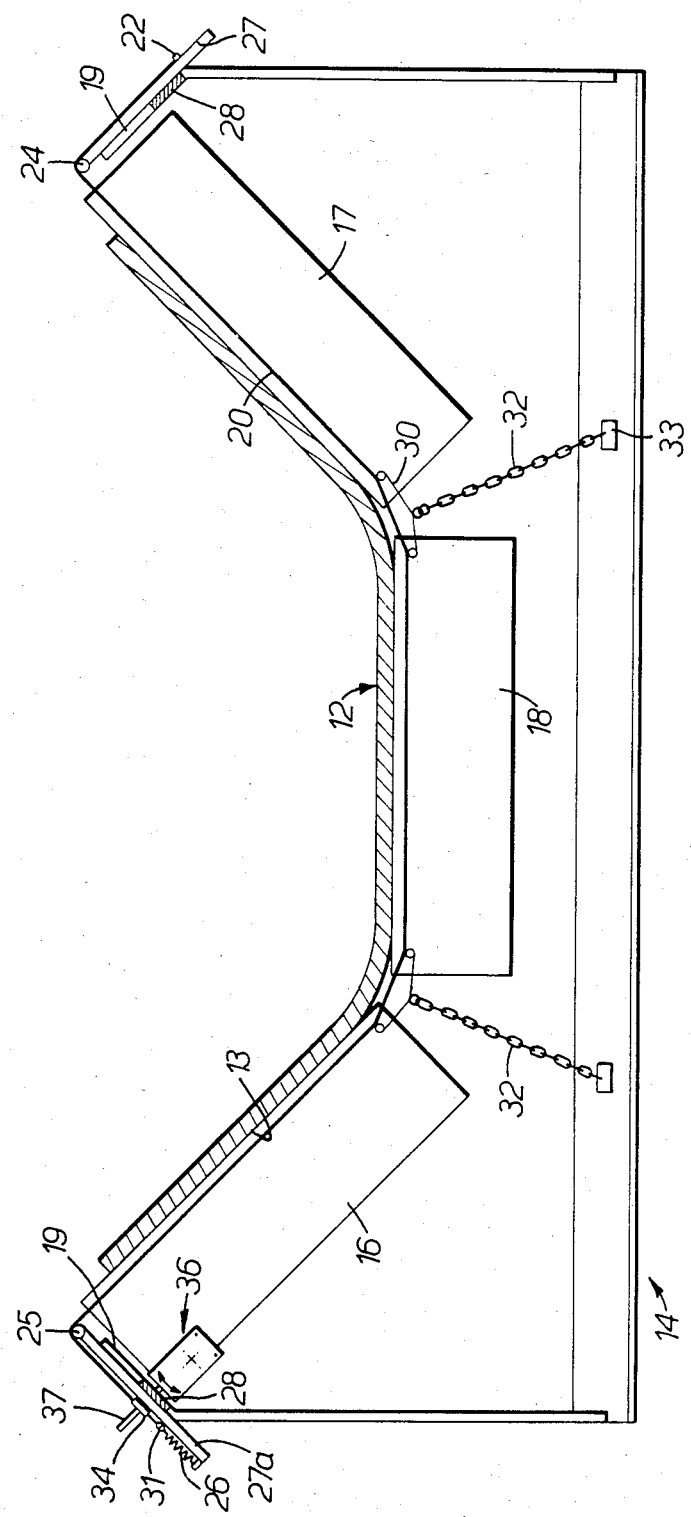
FIG. 2 is a cross-section on the line 2—2 in FIG. 1.
Figure 4:
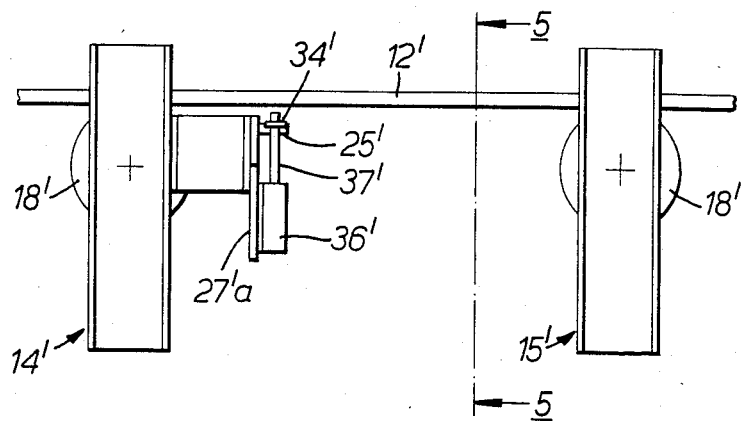
Figure 5:
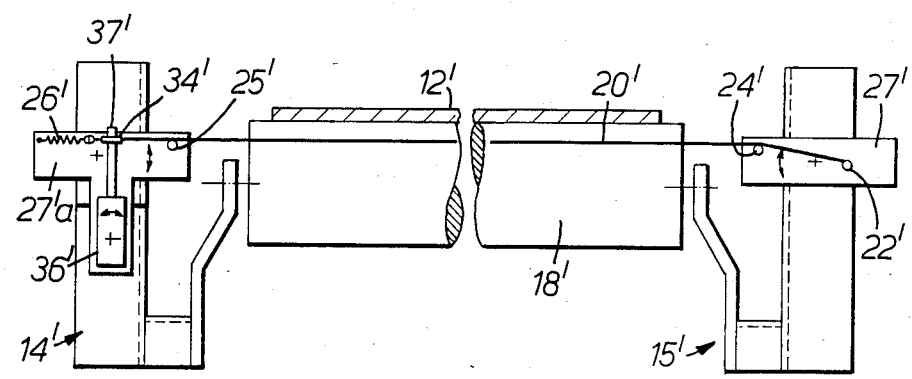

FIG. 3 is a detailed view showing one end of the string line forming part of the apparatus depicted in FIGS. 1 and 2; and FIGS. 4 and 5 are similar views to those of FIGS. 1 and 2 for a flat bed conveyor.

The material-handling belt conveyor system partially illustrated in FIGS. 1 to 3 includes a troughed conveyor belt 12 supported for continuous movement by a train of roller stands, of which two, 14, 15 are shown. Each roller stand would typically include a pair of inclined side rollers 16, 17 and one or more horizontally aligned bed rollers 18. Belt 12 would typically be employed for the transport of particulate material and it would be highly desirable to stop the operation of the conveyor immediately a defect such as a tear or loose patch became significant. Immediate detection is especially desirable in a feed chute impact area.

To this end, defect detection apparatus in accordance with the invention is fitted between two successive roller stands 14, 15. To each side of the roller, a tie bar 28 bridges the stands by being fastened to a pair of lugs 29a, 29b welded to the oblique upper terminal portions 19 of stands 14, 15. Each tie bar 28 adjustably carries a fulcrum plate 27, 27a, positioned with its rolled edge 24, 25 uppermost. Each fulcrum plate can be moved up and down to vary the spacing between edge 25 and the plane of belt 12.

A line 20 comprising an extensible string, for example nylon fishing line, is held substantially taut in a position extending across and in close proximity to the undersurface 13 of belt 12, which surface moves past line 20 during operation of the conveyor. The string line is profiled to the belt undersurface, being guided from a fixed anchor 22 on one fulcrum plate 27 over the rolled edges 24, 25 of the respective plates for coupling to the other fulcrum plate 27a by a tensioned spring 26 anchored to plate 27a at one end and attached at the other to line 20 by a swivel 31. The line is anchored in a stretched state to tauten it under tension sustained by spring 26.

At the base of the belt 12, the string line is positioned adjacent the longitudinal bends in the belt by respective radius clips 30, each supported on an adjustable length chain 32, to give an enhanced profile for the string in the trough radii. Chains 32 are hooked on respective brackets 33 at the base of the "downstream" stand 14 and may be used to slightly adjust the position of the line. A nominal clearance, for example 6 to 10 mm, is set between the line and the loaded belt, taking account of belt conditions, by careful adjustment of the fulcrum plates 27, 27a and/or chain ties 32. Adjustment is made, for example to clear patches or other acceptable defects: it can be expected that the average clearance will be between 5 and 15 mm.

String line 20 is not quite continuous to the tension spring but is divided just above the spring, by a small ring or washer 34 (FIG. 3). The control element 37 of trigger means 36, in the guise of a rat-tail microswitch fixed behind fulcrum plate 27a protrudes through a slot in the plate and thence through ring 34. On operative lateral movement of its control element 37, switch 36 opens a circuit by which an indicating signal is transmitted to the conveyor drive (not shown) to switch off the drive and so stop the conveyor. The signal may additionally or alternatively be used to set an alarm or other warning device.

It will be appreciated that any significant disturbance of string line 20 will cause movement of ring 34 which, being complementary to control element 37, will trigger the microswitch to initiate a reaction, as just described, to the disturbance. Disturbance might, for example, be loss of tension brought about by severing of the string line by a protrusion on the conveyor such as a tear, a broken wire or spilling material, or it might be extension of the line and increased tension, as it is deviated by a flap, loose patch or depression. In the former case, the spring 26 will relax and thereby pull on ring 34 to trigger the switch.

The arrangement of FIGS. 1 to 3 is especially suitable for use at a feed chute impact area and indeed where there were multiple chutes a line would be fitted immediately in front of each.

For detecting a defect on a flat bed portion of a conveyor, the arrangement of FIGS. 4 and 5 may be employed. Here, the line 20' is straight. Again, one end of the string line 20' is fixedly anchored at 22' while the other is attached to a tensioned spring 26', itself fixed to a T-shaped fulcrum plate 27'a fastened to, but spaced from, stand 14'. Pegs 24', 25' locate line 20' to either side of the conveyor and the trigger means again consists of a ring 34' in the string line and the complementary control element 37' of a rat-tail microswitch 36'.

For detecting a defect which manifests itself in the top cover or support surface of a conveyor, the line may be extended across the outside surface of the conveyor as it reverses direction about an end roller at a return roller stand. Such a line would detect, for example, wire protrusions, loose patches and punctures caused by material going around the return roller.

It is believed that the invention will achieve very early detection of and reaction to conveyor defects, preventing further damage and minimizing repair costs. The installation is simple and inexpensive, both to install and to operate, and occupies very little physical space. It is readily adaptable to existing installations. Cleaning and maintenance operations are not substantially hindered. Operation can be expected to be highly reliable. Resetting is a simple matter and maintenance is otherwise minimal. Product spillage does not render the installation inoperative but rather contributes to its early response, and there is no likelihood that spillage might contribute to further conveyor damage. Adjustment for belt condition, by adjustment of belt-to-string clearance, is readily effected, as is sensitivity, by virtue of the tolerances within the microswitch configuration with respect to the line, and a wide range of defect types on both conveyor surfaces can be detected. The device can be adjusted to activate upon impact by either very fine material or small protrusions, and yet be unaffected by outside shock, or de-sensitized by increasing the belt-to-string clearance to clear known acceptable defects in the belt.

It should be noted that the microswitch need not necessarily be positioned to sense a ring actually in string line 20. For example, the ring may be part of or coupled to chain 32, or otherwise attached at an intermediate point on the line. Whatever the arrangement, the ring is preferably directly spring loaded by a tensioned spring to facilitate detection of a line break.

I claim:

1. In a belt conveyor installation, apparatus for detecting a defect in the conveyor belt when it is moving, comprising line holding means for holding a line substantially taut in a position extending across and in close proximity to a surface of the conveyor belt, which surface moves past the line during operation of the conveyor; and trigger means, responsive both to loss of tension and to increased tension in said line caused by disturbance of the line by a protrusion from said surface arising from said defect, for initiating a reaction to such disturbance.

2. Apparatus according to claim 1 wherein said line holding means includes a pair of anchors, the line being directly fixed to one of the anchors and coupled to the other by means including a tensioned spring, and wherein the trigger means is positioned to be responsive to movement of the line in the vicinity of the tensioned spring.

3. Apparatus according to claim 1 wherein said trigger means comprises a ring in or attached to the line, and a switch device with a control element protruding through the ring for operative engagement by the ring as the ring moves on disturbance of the line, which control element is actuable by movement of the ring in either of the directions corresponding respectively to loss of tension or increased tension in said line.

4. Apparatus according to claim 1 in an installation having a troughed conveyor belt, wherein the line is disposed under the troughed conveyor belt.

5. Apparatus according to claim 4 wherein the line holding means includes a plurality of depending chains or like ties for profiling the line about longitudinal bends in the conveyor belt, which chains are adjustable to vary the position of the line with respect to the belt.

6. Apparatus according to claim 4 wherein said line holding means includes a pair of anchors, the line being directly fixed to one of the anchors and coupled to the other by means including a tensioned spring, and wherein the trigger means is positioned to be responsive to movement of the line in the vicinity of the tensioned spring.

7. Apparatus according to claim 4 wherein said trigger means comprises a ring in or attached to the line, and a switch device with a control element protruding through the ring for operative engagement by the ring as the ring moves on disturbance of the line.

8. Apparatus according to claim 1 wherein the line is a string.

9. Apparatus according to claim 1 wherein the line is, on average, between 5 and 15 mm from said surface of the conveyor belt.

10. Apparatus according to claim 1 wherein the trigger means includes a switch in the control mechanism for the conveyor installation whereby said reaction comprises stopping movement of the conveyor belt.

11. Apparatus according to claim 5, wherein the line holding means further includes a plurality of clips secured to said chains or like ties, which clips each hold the line at two spaced locations and thereby enhance the profile of the line about said longitudinal bends in the conveyor belt.

* * * * *